(12) United States Patent
Gartner et al.

(10) Patent No.: US 8,403,115 B2
(45) Date of Patent: Mar. 26, 2013

(54) DUAL RATE GAS SPRING SHOCK ABSORBER

(75) Inventors: Bill J. Gartner, Wyomissing, PA (US); Andrew B. Lambert, Fleetwood, PA (US); James M. Arentz, Sinking Spring, PA (US)

(73) Assignee: Penske Racing Shocks, Reading, PA (US)

( * ) Notice: Subject to any disclaimer, the term of this patent is extended or adjusted under 35 U.S.C. 154(b) by 1074 days.

(21) Appl. No.: 12/352,279

(22) Filed: Jan. 12, 2009

(65) Prior Publication Data

US 2009/0200760 A1 Aug. 13, 2009

Related U.S. Application Data

(60) Provisional application No. 61/020,562, filed on Jan. 11, 2008.

(51) Int. Cl.
*F16F 9/06* (2006.01)
*F16F 5/00* (2006.01)

(52) U.S. Cl. .................................. 188/297; 267/64.26

(58) Field of Classification Search .................. 188/297, 188/313, 314, 316, 315, 317, 318, 298; 267/64.15, 267/64.26, 64.28; 280/124.158
See application file for complete search history.

(56) References Cited

U.S. PATENT DOCUMENTS

| | | |
|---|---|---|
| 1,094,567 A | 4/1914 | Hofmann |
| 1,281,079 A | 10/1918 | Sears |
| 1,492,328 A | 4/1924 | Lang |
| 2,101,265 A | 12/1937 | Mercier |
| 2,115,072 A | 4/1938 | Hunt et al. |
| 2,894,742 A | 7/1959 | Peterson |
| 3,039,761 A | 6/1962 | Van zijp |
| 3,085,771 A | 4/1963 | Peterson |
| 3,164,381 A | 1/1965 | Tuczek |
| 3,171,643 A * | 3/1965 | Roos .......................... 267/64.15 |
| 3,201,110 A | 8/1965 | Taccone |
| 3,237,726 A | 3/1966 | Deyerling |
| 3,379,430 A | 4/1968 | Hennells |
| 3,414,092 A | 12/1968 | Speckhart |
| 3,722,875 A | 3/1973 | Hasse |
| 3,856,287 A | 12/1974 | Freitag |
| 3,970,292 A | 7/1976 | Dachicourt et al. |
| RE29,497 E | 12/1977 | Freitag |
| 4,132,395 A | 1/1979 | Fox, Jr. |
| 4,145,067 A | 3/1979 | Ceriani |
| 4,206,934 A | 6/1980 | McKee |

(Continued)

FOREIGN PATENT DOCUMENTS

| | | |
|---|---|---|
| DE | 1455159 | 3/1969 |
| DE | 3233160 | 3/1984 |

(Continued)

OTHER PUBLICATIONS

2006 Float X Evol Shock Owner's Manual, P/N:605-00-060, Fox Factory, Inc.

(Continued)

*Primary Examiner* — Thomas J Williams
(74) *Attorney, Agent, or Firm* — John V. Daniluck; Bingham Greenebaum Doll LLP

(57) ABSTRACT

Apparatus and methods for providing a biasing force to a vehicle suspension. The apparatus includes a hydraulic shock absorber that coacts with a gas spring. In some embodiments, the gas spring is externally adjustable with regards to gas pressure, and also with regards to the amount of internal travel possible by a floating gas piston.

16 Claims, 16 Drawing Sheets

U.S. PATENT DOCUMENTS

| | | |
|---|---|---|
| 4,325,541 A | 4/1982 | Korosladanyi et al. |
| 4,509,730 A | 4/1985 | Shtarkman |
| 4,527,676 A | 7/1985 | Emura et al. |
| 4,530,425 A | 7/1985 | Veaux et al. |
| 4,534,580 A | 8/1985 | Kobayashi et al. |
| 4,576,258 A | 3/1986 | Spisak et al. |
| 4,598,929 A | 7/1986 | Kumagai et al. |
| 4,613,116 A | 9/1986 | Buma |
| 4,616,811 A | 10/1986 | Buma |
| 4,629,170 A | 12/1986 | Warmuth, II |
| 4,635,906 A | 1/1987 | Buma |
| 4,659,070 A | 4/1987 | Buma |
| 4,660,810 A | 4/1987 | Buma |
| 4,666,135 A | 5/1987 | Buma et al. |
| 4,673,171 A | 6/1987 | Buma |
| 4,697,796 A | 10/1987 | Kitamura et al. |
| 4,735,401 A | 4/1988 | Buma et al. |
| 4,746,106 A | 5/1988 | Fukumura |
| 4,768,758 A | 9/1988 | Buma |
| 4,844,428 A | 7/1989 | Margolis et al. |
| 4,899,853 A | 2/1990 | Hummel |
| 4,901,986 A | 2/1990 | Smith |
| 4,958,706 A | 9/1990 | Richardson et al. |
| 5,111,735 A | 5/1992 | Johnson |
| 5,158,270 A | 10/1992 | Lin |
| 5,169,129 A | 12/1992 | Hoffman |
| 5,186,481 A | 2/1993 | Turner |
| 5,201,388 A | 4/1993 | Malm |
| 5,222,759 A | 6/1993 | Wanner et al. |
| 5,285,875 A | 2/1994 | Munoz |
| 5,346,236 A | 9/1994 | Ohma |
| 5,392,885 A | 2/1995 | Patzenhauer et al. |
| 5,413,316 A | 5/1995 | Easter |
| 5,454,452 A | 10/1995 | Ohlin |
| 5,486,018 A | 1/1996 | Sakai |
| 5,509,674 A | 4/1996 | Browning |
| 5,527,060 A | 6/1996 | Kutsche |
| 5,538,276 A | 7/1996 | Tullis |
| 5,586,781 A | 12/1996 | Anderson |
| 5,653,315 A | 8/1997 | Ekquist et al. |
| 5,775,677 A | 7/1998 | Englund |
| 5,799,758 A | 9/1998 | Huang |
| 5,873,437 A | 2/1999 | Danek |
| 5,915,674 A | 6/1999 | Wolf et al. |
| 5,921,572 A | 7/1999 | Bard et al. |
| 5,957,252 A | 9/1999 | Berthold |
| 6,029,958 A | 2/2000 | Larsson et al. |
| 6,095,541 A | 8/2000 | Turner et al. |
| 6,105,988 A | 8/2000 | Turner et al. |
| 6,109,400 A | 8/2000 | Ayyildiz et al. |
| 6,135,434 A | 10/2000 | Marking |
| 6,267,400 B1 | 7/2001 | McAndrews |
| 6,279,703 B1 | 8/2001 | Mete |
| 6,296,092 B1 | 10/2001 | Marking et al. |
| 6,311,962 B1 | 11/2001 | Marking |
| 6,340,153 B1 | 1/2002 | Miesner |
| 6,360,857 B1 | 3/2002 | Fox et al. |
| 6,386,525 B1 | 5/2002 | Stuart |
| 6,412,759 B1 | 7/2002 | Krauss |
| 6,415,895 B2 | 7/2002 | Marking et al. |
| 6,464,053 B1 | 10/2002 | Hoebrechts |
| 6,464,201 B2 | 10/2002 | Job |
| 6,467,592 B1 | 10/2002 | Dernebo |
| 6,508,460 B2 | 1/2003 | Job |
| 6,543,754 B2 | 4/2003 | Ogura |
| 6,556,907 B1 | 4/2003 | Sakai |
| 6,581,948 B2 | 6/2003 | Fox |
| 6,592,136 B2 | 7/2003 | Becker et al. |
| 6,604,751 B2 | 8/2003 | Fox |
| 6,640,943 B1 | 11/2003 | Daws et al. |
| 6,659,240 B2 | 12/2003 | Dernebo |
| 6,659,241 B2 | 12/2003 | Sendrea |
| 6,688,626 B2 | 2/2004 | Felsl et al. |
| 6,698,730 B2 | 3/2004 | Easter |
| 6,708,803 B2 | 3/2004 | Jensen |
| 6,722,678 B2 | 4/2004 | McAndrews |
| 6,824,146 B2 | 11/2004 | Kang |
| 6,883,810 B2 | 4/2005 | Svartz et al. |
| 6,911,050 B2 * | 6/2005 | Molino et al. ................ 188/297 |
| 6,974,001 B2 | 12/2005 | Bauman |
| 6,991,076 B2 | 1/2006 | McAndrews |
| 7,128,192 B2 | 10/2006 | Fox |
| 7,140,601 B2 | 11/2006 | Nesbitt et al. |
| 7,163,223 B2 | 1/2007 | Wesling et al. |
| 7,172,057 B2 | 2/2007 | Gundermann et al. |
| 7,195,234 B2 | 3/2007 | Jordan et al. |
| 7,261,194 B2 | 8/2007 | Fox |
| 7,273,137 B2 | 9/2007 | Fox |
| 7,299,908 B2 | 11/2007 | Achenbach |
| 7,478,708 B2 * | 1/2009 | Bugaj ........................ 188/314 |
| 2003/0234144 A1 | 12/2003 | Fox |
| 2006/0289258 A1 | 12/2006 | Fox |
| 2007/0012531 A1 | 1/2007 | Fox |
| 2007/0119670 A1 | 5/2007 | Fox |
| 2007/0119672 A1 | 5/2007 | Becker |
| 2007/0227844 A1 | 10/2007 | Fox |
| 2007/0227845 A1 | 10/2007 | Fox |

FOREIGN PATENT DOCUMENTS

| | | |
|---|---|---|
| DE | 4018712 | 12/1991 |
| DE | 4429562 | 2/1996 |
| DE | 10236621 | 3/2004 |
| DE | 102004021586 | 12/2005 |
| EP | 0166702 | 1/1986 |
| EP | 0420610 | 4/1991 |
| EP | 474171 | 3/1992 |
| EP | 0607545 | 7/1994 |
| EP | 1296082 | 3/2003 |
| EP | 1464866 | 10/2004 |
| ES | 544557 | 6/1985 |
| FI | 931949 | 4/1993 |
| FR | 2728948 | 7/1996 |
| FR | 2863328 | 6/2005 |
| GB | 2265435 | 9/1993 |
| IT | 01237933 | 6/1993 |
| IT | 01247985 | 6/1995 |
| JP | 570185609 | 1/1982 |
| JP | 59026639 | 2/1984 |
| JP | 61235212 | 10/1986 |
| JP | 07167189 | 7/1995 |
| SU | 623759 | 9/1978 |
| WO | 9903726 | 1/1999 |
| WO | 03029687 | 4/2003 |
| WO | 2004016966 | 2/2004 |
| WO | 2004041563 | 5/2004 |
| WO | 2004079222 | 9/2004 |
| WO | 2006065235 | 6/2006 |
| WO | 2007097699 | 8/2007 |

OTHER PUBLICATIONS

Arvin Meritor Technical Bulletin, TP-0754, Apr. 15, 2007.

* cited by examiner

DETAIL A

DUAL RATE GAS SPRING SHOCK ABSORBER

CROSS REFERENCE TO RELATED APPLICATION

This application claims the benefit of priority to U.S. Provisional Patent Application Ser. No. 61/020,562, filed Jan. 11, 2008, entitled DUAL RATE GAS SPRING SHOCK ABSORBER.

FIELD OF THE INVENTION

The present invention pertains to improvements in components for vehicle suspensions, and in particular to air springs and shock absorbers.

SUMMARY OF THE INVENTION

One embodiment of the present invention pertains to a method for biasing apart components of a vehicle suspension Another embodiment of the present invention includes a floating piston slidably received within the closed interior of a cylinder and a hydraulic shock absorber slidably received within the opened end of the cylinder.

Still other embodiments include defining a first sealed gas chamber between the piston and the closed end of the cylinder and defining a second sealed gas chamber by the piston, the shock absorber, and the opened end of the cylinder.

Further embodiments include sliding the shock absorber into the interior of the cylinder to a first position and moving the piston by compressing gas of the second chamber.

And yet other embodiments include sliding the shock absorber into the interior of the cylinder to a second position further within the interior of the cylinder than the first position and moving the piston by pushing the piston with the end of the shock absorber.

Other embodiments include a cylinder having an interior, an opened end, and a closed end, the cylinder slidably receiving the sealed end within the opened end.

Still other embodiments include a floating piston having two sides and being slidably received within the interior between the sealed end and the closed end, the piston forming a first sealed gas chamber between one side and the closed end, and forming a second sealed gas chamber between the other side and the opened end; wherein the sealed end extends into the second chamber.

Yet other embodiments include a piston slidably received within the interior between the sealed end and the closed end, the piston and the closed end forming a first sealed gas chamber, and the piston, shock absorber, and opened end forming a second sealed gas chamber.

Still other embodiments include a first valve for providing gas into the first chamber, and a second valve for providing gas into the second chamber.

Yet other embodiments pertain to an apparatus in which the travel of the floating piston can be stopped by an externally adjustable stop.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these myriad combinations is excessive and unnecessary.

DESCRIPTION OF THE PREFERRED EMBODIMENT

Figure 1A:
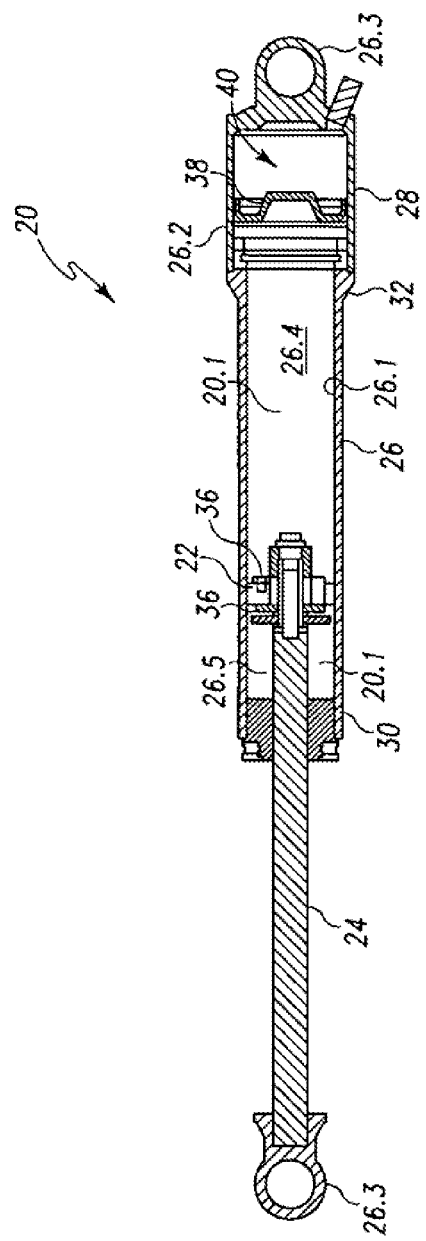
FIG. 1a is a cutaway view of a prior art shock absorber.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, etc.) may be stated herein, such specific quantities are presented as examples only.

Various embodiments of the present invention pertain to a combination spring/shock absorber assembly for a vehicle suspension. The spring characteristics of the assembly are provided by an gas spring. The air spring comprises a closed cylinder that uses one end of the shock absorber as a piston. Movement of the shock absorber into the secondary chamber compresses the volume and increases the pressure of the secondary chamber. This increased pressure results in a force imbalance on the floating piston, such that the floating piston moves further into the primary chamber so as to equalize the pressures on opposing faces of the floating piston. In some embodiments, the cylinder of the air spring further includes a floating piston that subdivides the internal chamber of the cylinder into primary and secondary chambers. In yet other embodiments, the swept volume of the floating piston is greater than the swept volume of the end of the shock absorber, which permits the end of the shock absorber to make physical contact with the floating piston. After contact, further movement of the shock absorber directly pushes on the floating piston.

FIG. 1 shows a cross-sectional view of a prior art shock absorber 20. A main piston 22 is coupled to a moveable rod 24, piston 22 being slidably received within the inner diameter 26.1 of a main cylinder 26. Piston 22 is retained on the end of rod 24 by a coupling nut 24.2. Main piston 22 generally subdivides the internal volume of cylinder 26 into a compression volume 26.4 located between piston 22 and the compression end 28 of shock 20, and a second rebound volume 26.5 located between piston 22 and the rebound end 30 of shock 20. The movement of piston 22 and rod 24 toward rebound end 32 results in a reduction in the size of compression volume 26.1, and the subsequent flow of hydraulic fluid 20.1 through a compression flowpath 32 in piston 22 and into the simultaneously enlarging rebound volume 26.5. Likewise, movement of piston 22 toward rebound end 30 of shock 20 results in the flow of hydraulic fluid 20.1 through a rebound flowpath 34 in piston 22 and into the simultaneously enlarging compression volume 26.4.

In order to compensate for changes in the density of hydraulic fluid 20.1, shock absorber 20 includes a nitrogen chamber separated by a reservoir piston 38 from the fluid-wetted volume of cylinder 26.

Shock absorber 20 is typically used with the suspension of a vehicle. Rod 24 includes a first suspension attachment 26.3, and end cap 26.2 of cylinder 26 includes a second suspension attachment 26.3. Rod 24 extends through an end cap and rod seal assembly 26.7 that is attached to one end of cylinder 26. End cap 26.7 preferably includes one or more of resilient seals that seal against the outer diameter of rod 24 and one or more wipers designed to keep any dirt or contaminants on the rod outer surface from reaching the seals. These suspension attachments 26.3 permit the pivotal connection of shock absorber 20 to a portion of the vehicle suspension on one end, and on the other end to a portion of the vehicle frame. It is well known to use shock absorbers on many types of vehicles, including motorcycles, buses, trucks, automobiles, and airplanes. Further, although shock absorber 20 has been referred to for being used on a vehicle, shock absorbers are also known to be used in other applications where it is beneficial to dampen the movement of one object relative to another object, such as dampers for doors.

Compression flowpath 32 includes a fluid passageway interconnecting volumes 26.4 and 26.5 with a one-way valve in the flowpath 32. This one-way valve can be one or more annular shims which are prevented from flexing in one direction (and thus substantially restricting flow), but able to flex in a different direction (and thus allow flow in this opposite direction). Likewise, rebound flowpath 34 provides fluid communication between volumes 26.4 and 26.5 through a one-way valve. Often, the one-way valve of the compression flowpath 32 has different characteristics than the one-way valve of rebound flowpath 34.

Figure 1B:
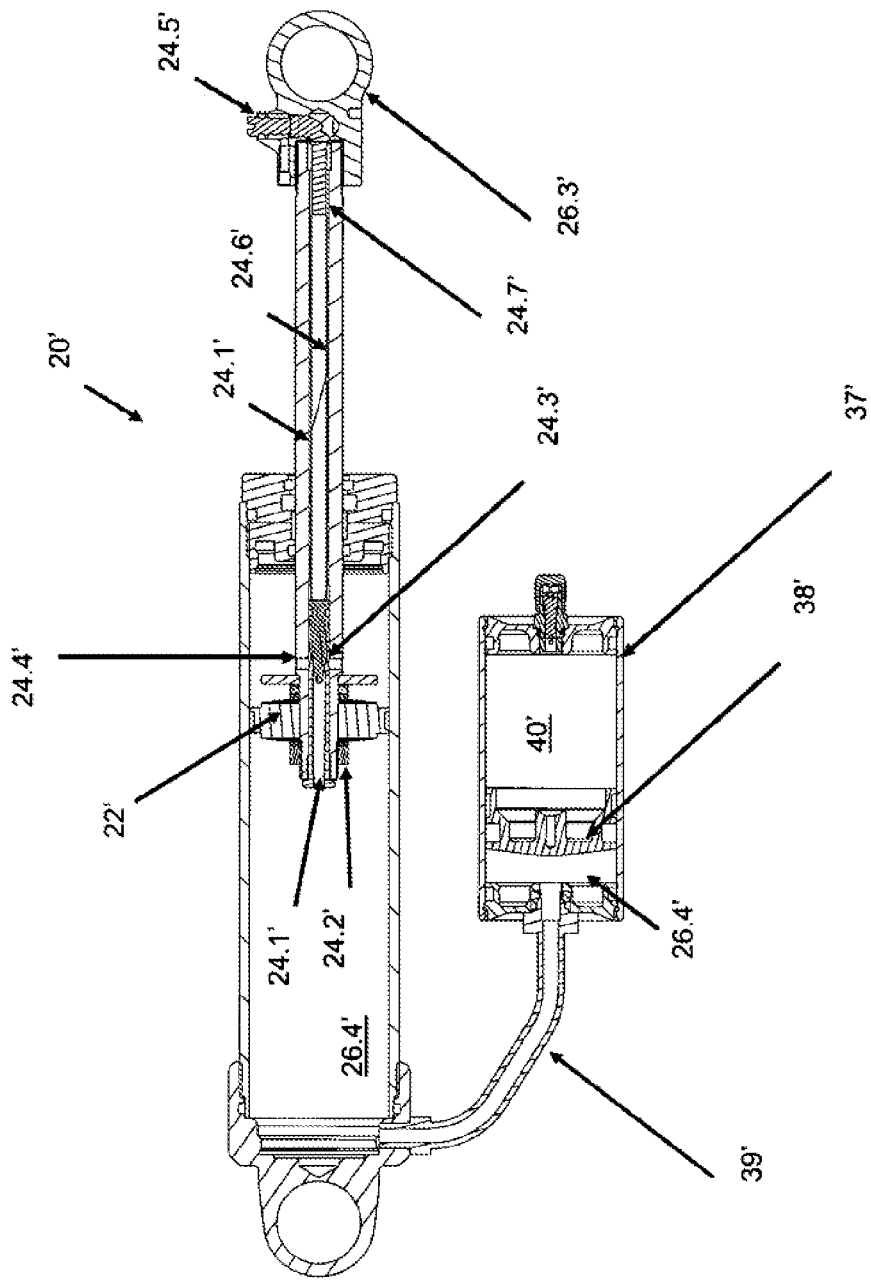
FIG. 1b is a cutaway view of another prior art shock absorber.

FIG. 1b shows a cross-sectional view of a second prior art shock absorber 20'. Shock absorber 20' includes a second, separate cylinder 37' which includes gas reservoir 40'. A piston 38' slidably received within cylinder 37' separates gas volume 40' from compression volume 26.4'. An external fluid connection 39' interconnects the hydraulic fluid end of piston 37' with the compression end of shock absorber 20'. Cylinder 37' includes a gas port in one end of cylinder 37' for entry or removal of nitrogen.

Shock absorber 20' includes means for varying the fluid resistance of a flowpath interconnecting compression volume 26.4' and rebound volume 26.5'. Rod 24' includes an internal passage 24.1' that extends out one end of shaft 24', and extends in the opposite direction towards attachment 26.3'. The open end of internal passage 24.1' is in fluid communication with one or more orifices 24.4' that extend from internal passage 24.1' to rebound volume 26.5'. The flow of fluid through this internal passageway between the compression and rebound volumes is restricted by a metering needle 24.3' received within internal passage 24.1'. The position of metering needle 24.3' can be altered by a pushrod 24.6' also extending within internal passage 24.1'. Push rod 24.6' includes an end 24.7' that is adapted and configured to mate with an internal adjustment screw 24.5'. The inward adjustment of screw 24.5' acts on the angled interface to push rod 24.6' and adjustment needle 24.3' toward a position of increased resistance in the internal flowpath.

Figure 1C:
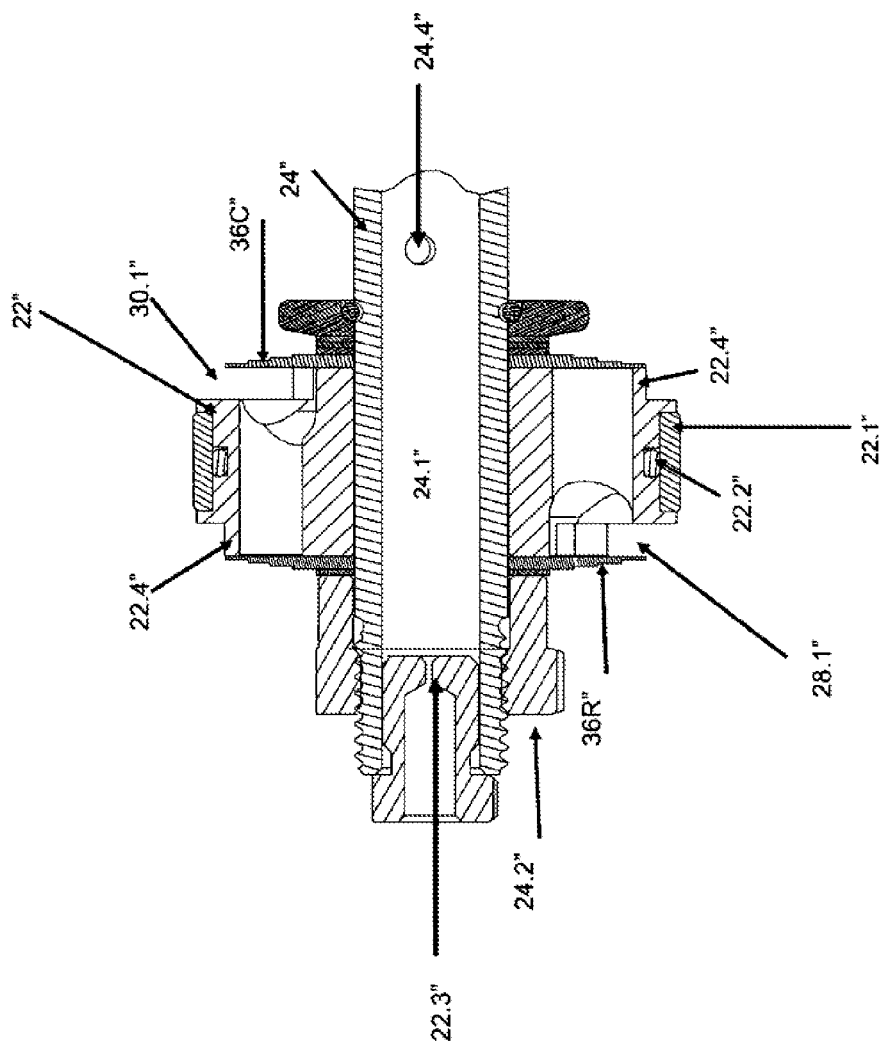
FIG. 1c is a cutaway view of a portion of another prior art shock absorber.

FIG. 1c is a cross sectional view of a portion of another prior art shock absorber. The apparatus in FIG. 1c shows a piston 22" coupled to a shaft 24" by a coupling nut 24.2". Shaft 24" includes an internal flowpath from orifice 22.3" through internal passage 24.1" and into shaft orifice 24.4". This internal flowpath bypasses piston 22".

Piston 22" includes a pair of shim sets 36", each shim set shown including 4 individual washers. During operation in compression (i.e., movement in FIG. 1c toward the left) fluid is able to freely enter compression flowpath 28.1". However, fluid is unable to exit through flowpath 28.1" and into the rebound side of the shock absorber unless fluid pressure is sufficiently great to bend the periphery shim stack 36C" away from the shim edge support 29.4" of piston 22". During operation in rebound, (i.e., movement in FIG. 1c toward the right) fluid is able to freely enter compression flowpath 30.1". However, fluid is unable to exit through flowpath 30.1" and into the compression side of the shock absorber unless fluid pressure is sufficiently great to bend the periphery shim stack 36R" away from the shim edge support 29.4" of piston 22".

A resilient seal 22.1" substantially seals the compressive side of piston 22" from the rebound side of piston 22". An energizing backup seal 22.2" urges seal 22.1" outwardly into contact with the inner wall of the cylinder.

FIGS. 2-5 present various views of an assembly 121 according to one embodiment of the present invention. Apparatus 120 is a combined air spring and shock absorber, with applications including the suspensions of off road vehicles, motorcycles, all terrain vehicles, snowmobiles, and the like. However, these applications are presented by way of example only, and are not to be construed as limiting.

Assembly 120 includes a hydraulic shock absorber 121 that is received within the opened end 60.1 of the cylinder 60 of a gas spring assembly 50. Apparatus 120 includes mounting attachments 126.3 for coupling of assembly 120 to different components of a vehicle suspension.

Figure 2:
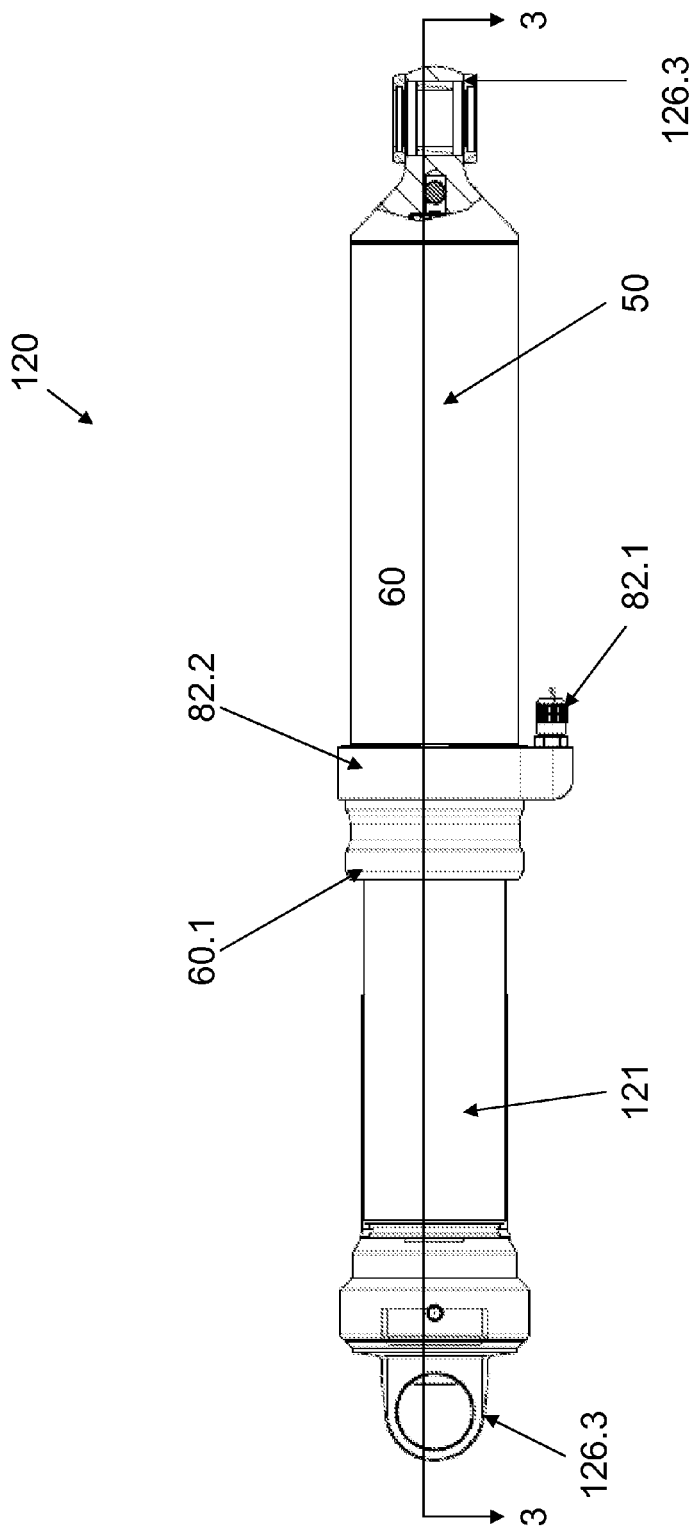
FIG. 2 is side elevational view of an air spring and shock absorber according to one embodiment of the present invention.
Figure 3:
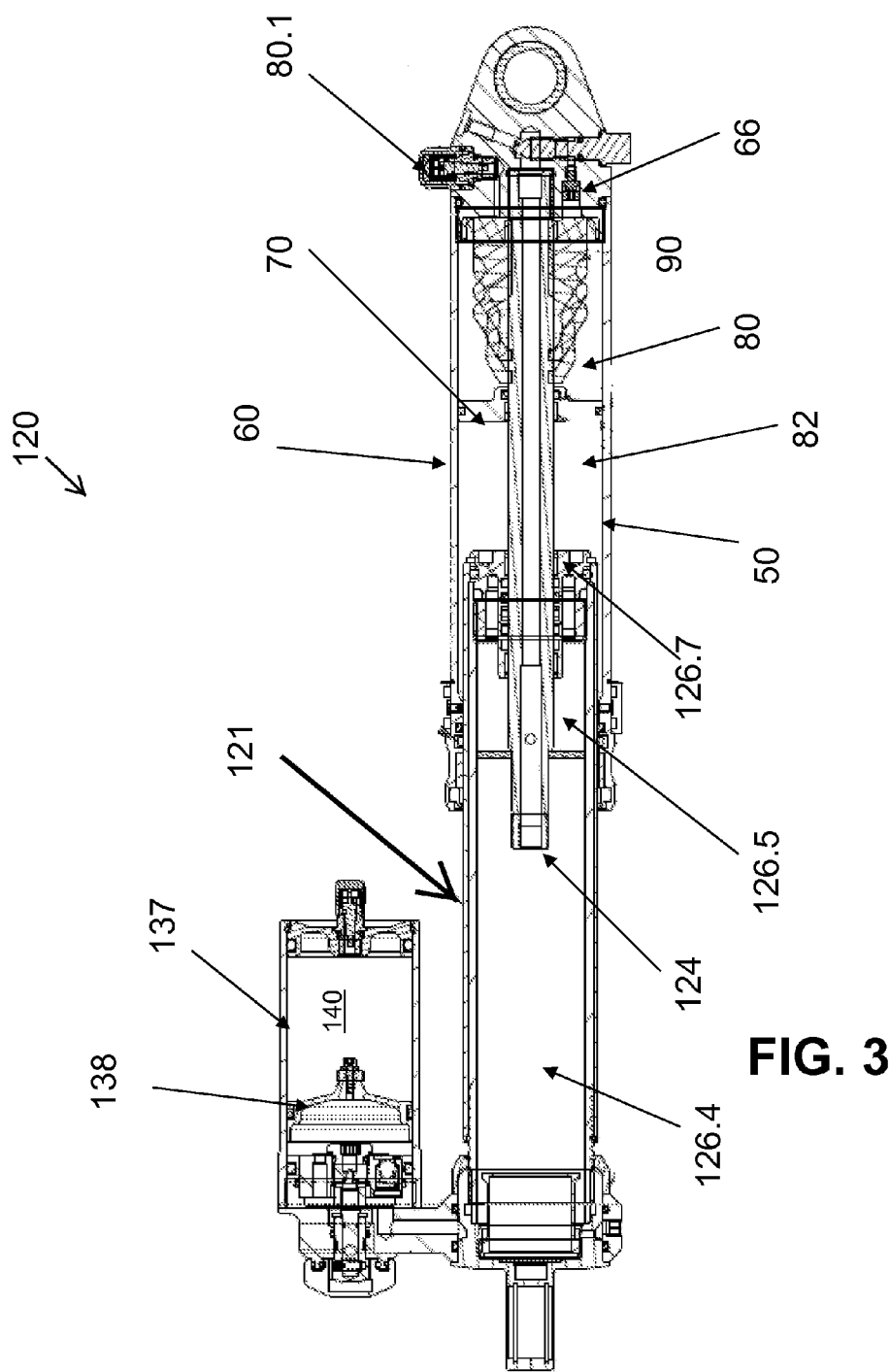
FIG. 3 is a side elevational cutaway view of the apparatus of FIG. 2, as viewed along line 3-3 of FIG. 2.

FIG. 3 is a cutaway view of assembly 120 as viewed along line 3-3 of FIG. 2. Shock absorber 121 is similar to shock absorbers 20 and 20' as previously described. Shock absorber 121 includes internal rebound and compression volumes 126.5 and 126.4, respectively, separated by a piston 122 (not shown) that is attached to an internal rod 124. A second cylinder 137 includes a floating piston 138 that separates hydraulic fluid of compression volume 126.4 from a stored gas charge 140.

Figure 4:
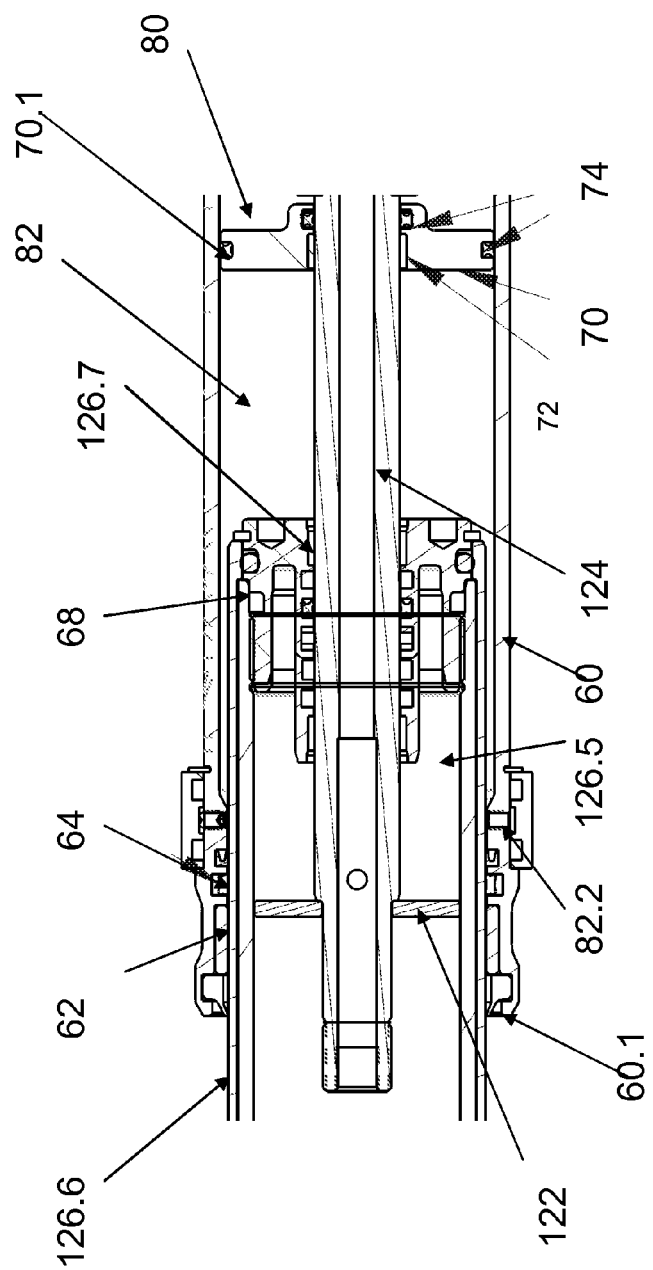
FIG. 4 is an enlargement of a portion of the apparatus of FIG. 3.

As best seen in FIG. 4, outer cylinder 60 includes one or more sliding contact seals 64 that are attached to the inner diameter 62 of cylinder 60. Seal 64 forms a gas tight seal against the outer diameter 126.6 of shock absorber 121.

The end cap 126.7 of shock absorber 121 extends into a secondary gas chamber 82 within the interior of cylinder 60. A floating piston 70 establishes a boundary to secondary chamber 82, and in addition provides within the interior of cylinder 60 a primary gas spring chamber 80. Primary chamber 80 extends to an end cap 66 that closes the end 60.2 of cylinder 60.

Figure 5:
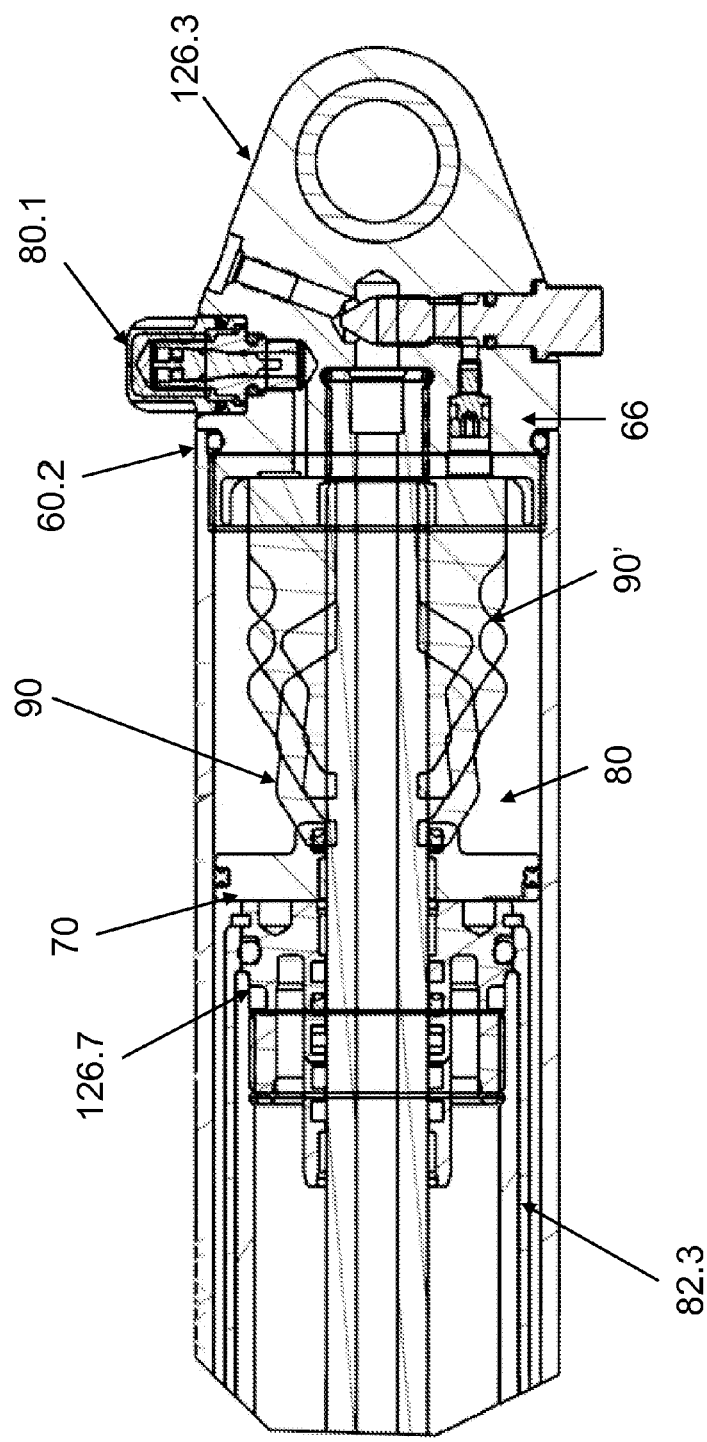
FIG. 5 shows a portion of the apparatus of FIG. 4 during a different mode of operation.

As best seen in FIGS. 3 and 5, primary gas chamber 80 preferably includes a resilient member 90 that is adapted and configured to provide a force that biases floating piston 70 away from the interior face of end cap 66. As shown in FIG. 5, member 90 can readily be compressed to a shortened length member 90' when contacted by floating piston 70. As piston 70 moves to the left (referring to FIG. 5), member 90 expands back to its uncompressed length. Although a repeatedly resilient member has been shown and described, such as an elastomeric boot, the present invention also contemplates embodiments that include other biasing components such as coil springs, and further contemplates those embodiments that do not include any biasing member 90.

FIGS. 3, 4, and 5, show rod 124 attached to end cap 66 of gas spring 50. Rod 124 extends through the interior of cylinder 60 and through end cap 126.7 of hydraulic shock absorber 121 into the wetted interior volume of shock absorber 121. End cap 126.7 functions as both a sealing and separating member between rebound volume 126.5 and secondary gas spring chamber 82. End cap 126.7 further combines with cylinder 126 to act as a gas piston 68 extending into the interior of cylinder 60.

Floating piston 70 subdivides the interior of cylinder 60 into primary and secondary chambers 80 and 82, respectively. Floating piston 70 includes a land in its out diameter 70.1 that supports a seal 74 which is in sealing contact with the inner diameter 62 of cylinder 60. The inner diameter 70.2 of floating piston 70 includes lands that support a bushing 72, which combines with shaft 124 to guide piston 70 within the interior of cylinder 60. The seals 74 on the inner diameter 70.2 couple with the seals 74 of the outer 74 of the outer diameter 70.1 to provide gas tight separation of primary chamber 80 from secondary chamber 82. Movement of floating piston 70 within the interior of cylinder 60 sweeps a volume that extends from the outer diameter of rod 124 to the inner diameter 62 of cylinder 60. For movement of both gas piston 68 and floating piston 70, their swept volume does not include the volume of interior 60 that is occupied by shaft 124. Therefore, the difference in swept volume between gas piston 68 and floating piston 70 is the annular volume 82.3 between the outer diameter of gas piston 68 and the inner diameter 62 of cylinder 60.

As best seen in FIG. 4, gas piston 68 has an outer diameter 126.6 that is smaller than the inner diameter 62 of cylinder 60. Therefore, as piston 68 sweeps into secondary chamber 82, an annular volume 82.3 is formed that is not displaced by piston 68.

Although what has been shown and described is an air spring including multiple internal pistons 68 and 70 that differ in terms of an annular volume 82.3 located around the inner diameter 62, the present invention also contemplates other embodiments having multiple pistons with different swept volumes. As another example, the present invention also contemplates those embodiments including an internal rod having multiple, separate chambers within the rod. A first internal chamber extends within the hydraulic shock absorber and provides fluid communication between the rebound and compression volumes as described earlier. A second, separate internal chamber is sealed from the aforementioned hydraulic communication passageway, but is in fluid communication with secondary gas chamber 82 through one or more passageways in the sidewall of the internal rod. In such embodiments, movement of piston 68 within the interior of cylinder 60 compresses gas within chamber 82 and also the gas within the second, separate gas passageway within the rod.

Apparatus 120 further includes valves for externally charging the gas pressure in the primary and secondary spring chambers 80 and 82, respectfully. Referring to FIG. 2, cylinder 60 includes a manifold 82.2 that generally surrounds the outer diameter of the cylinder. A gas fitting and check valve (such as a Schrader valve) is received within manifold 82.2. As best seen in FIGS. 2 and 4, valve 82.1 is in fluid communication with an internal passageway in the sidewall of cylinder 60. Gas (such as nitrogen or air) can be provided under pressure through fitting 82.2 to fill secondary spring chamber 82. Referring to FIG. 5, end cap 66 further includes a gas fitting and one way valve (such as a Schrader valve) 80.1 for introducing gas (such as air or nitrogen) into primary air spring chamber 80.

Operation of assembly 120 can be seen in FIGS. 4 and 5. FIG. 4 shows assembly 120 at a relatively extended position such that piston 68 is proximate to open end 60.1 of cylinder 60. The gas pressure within primary gas chamber 82 is roughly equivalent to the gas pressure within primary gas chamber 80. As the components of the vehicle suspension move toward each other, assembly 120 compresses in length. Piston 68 moves within secondary chamber 82 and compresses the gas therein. The increased pressure within chamber 82 places a pressure differential on floating piston 70, which causes piston 70 to move toward the right. This movement of floating piston 70 compresses the gas within chamber 80 until the forces on piston 70 are in approximate equilibrium. However, the compressive movement of assembly 120 results in the face of piston 68 moving closer to the opposing face of floating piston 70. This reduction in separation distance is not only a result of higher gas pressure in chambers 80 and 82, but is also a result of the difference in swept volume between gas piston 68 and floating piston 70. Axial movement of piston 68 displaces less volume for a unit of movement than the volume displaced by a unit of axial movement by floating piston 70.

Assembly 120 preferably includes an internal resilient member 90 that prevents metal to metal contact during full compression. Preferably, resilient member 90 is readily collapsible and provides no appreciable force to piston 70. However, in some embodiments, the balance of forces on floating piston 70 also includes the affect of internal bumper 90, which acts on piston 70 so as to bias it away from end cap 66. For those embodiments including an internal bumper 90, one effect of bumper 90 is to reduce the movement of floating piston 70, such that the separation distance between the opposing faces of gas piston 68 and floating piston 70 is further reduced.

As assembly 120 continues to compress, the opposing faces of pistons 68 and 70 move closer to each other. At a predetermined displacement of piston 68 within the interior of cylinder 60, the opposing faces of gas piston 68 and floating piston 70 come into contact, as best seen in FIG. 5. As compression of assembly 120 continues past this predetermined point, the resistive force provided by apparatus 20 is the force required to further compress primary air spring 80 only. In addition, the gas of secondary air spring 82 is compressed into annular volume 82.3. This volume increases as pistons 68 and 70 continue their combined movement.

Figure 6:
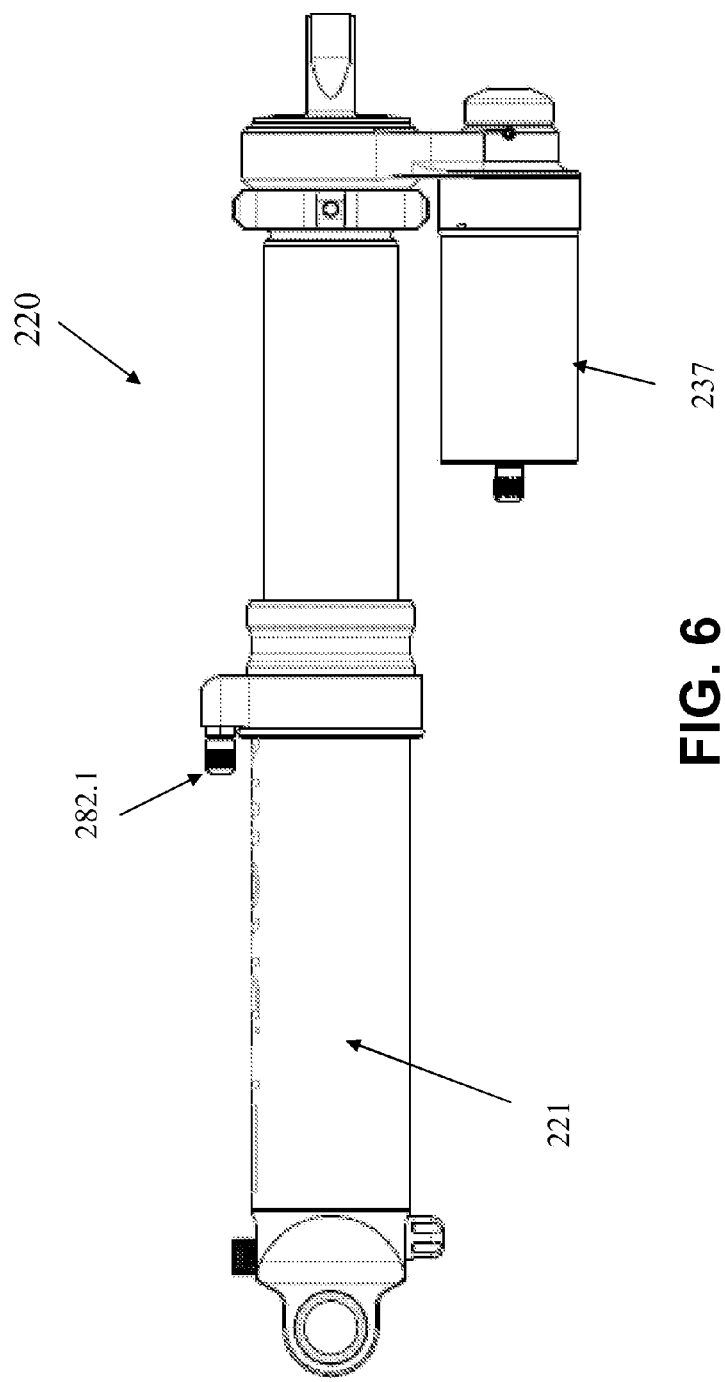
FIG. 6 is an external, side elevational view of an apparatus according to another embodiment of the present invention.
Figure 7:
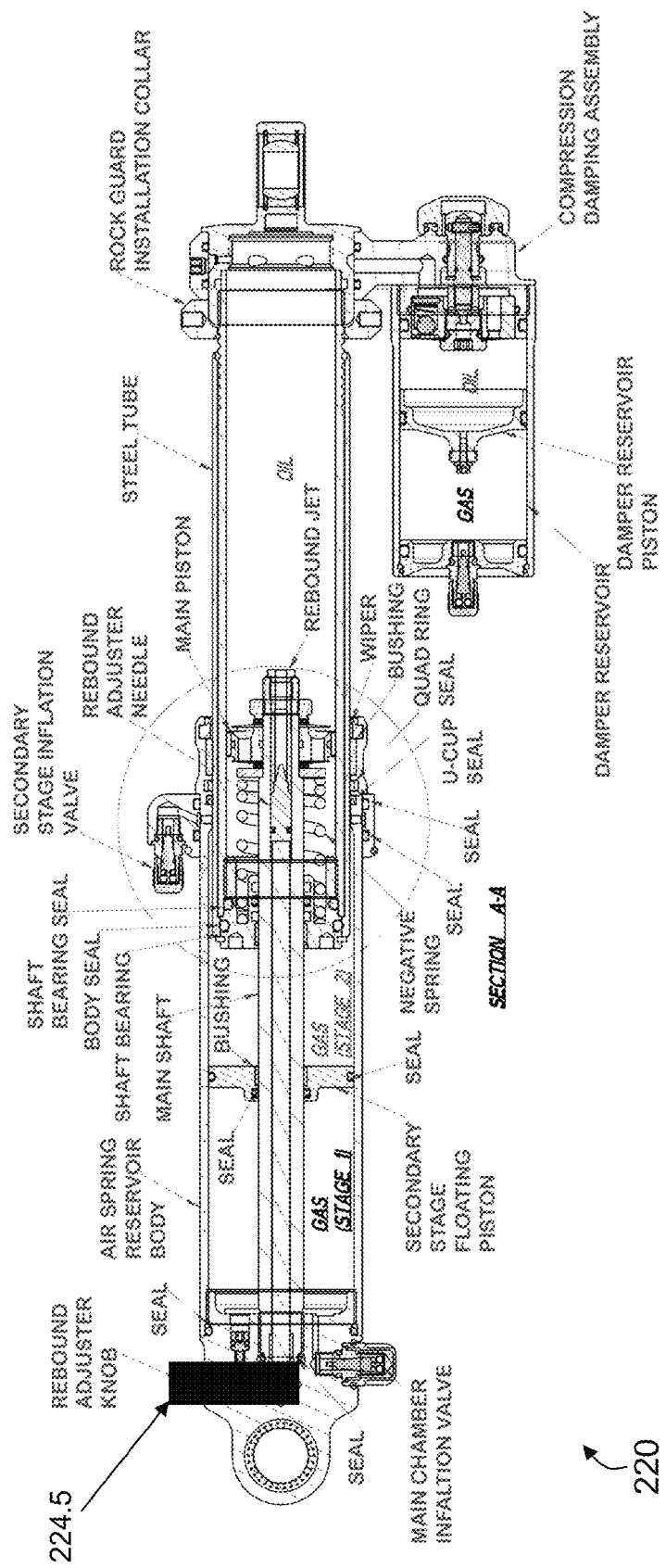
FIG. 7 is a cross sectional view of the apparatus of FIG. 6.
Figure 8:
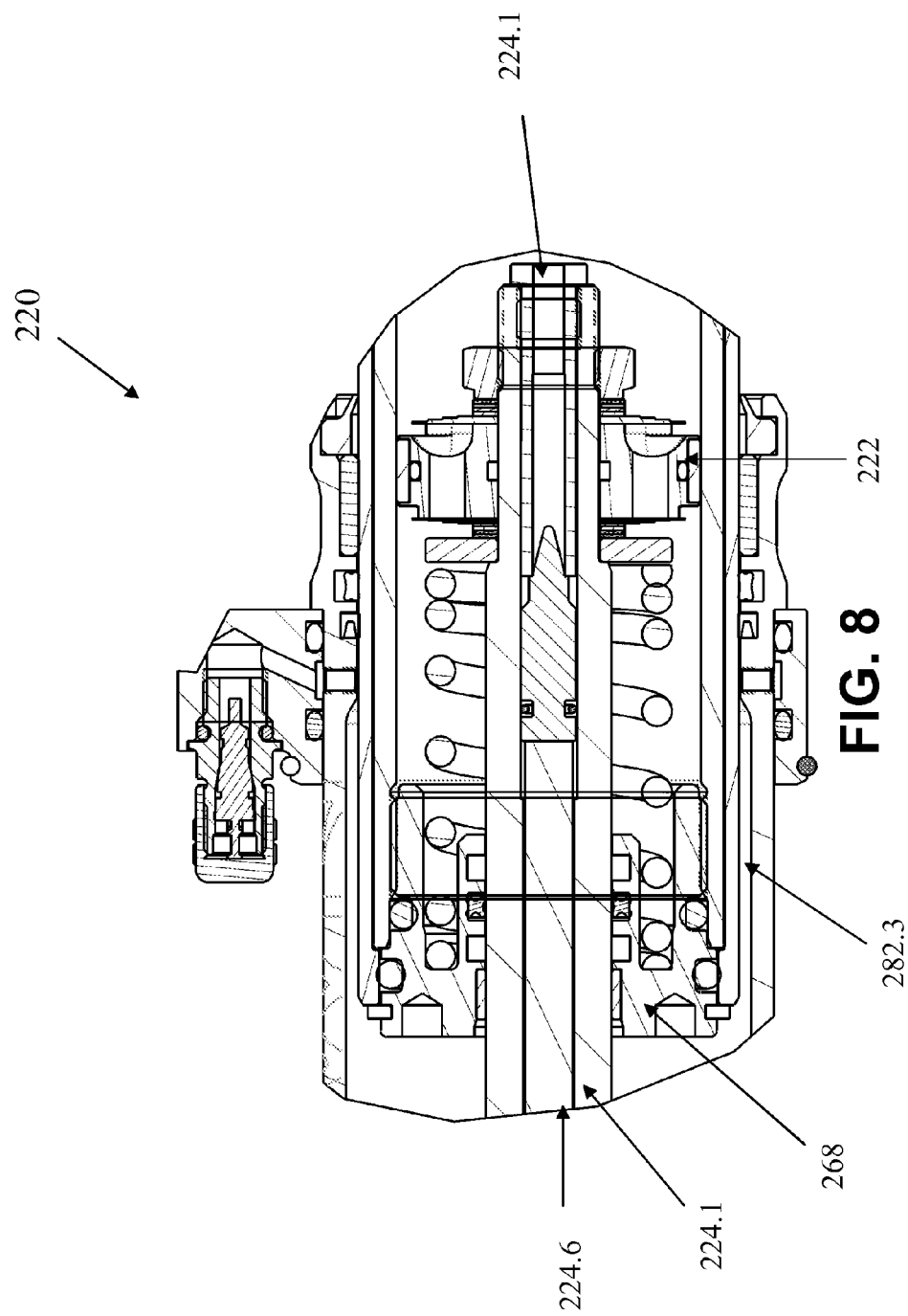
FIG. 8 is an enlarged cross sectional view of a portion of the apparatus of FIG. 7.
Figure 9:
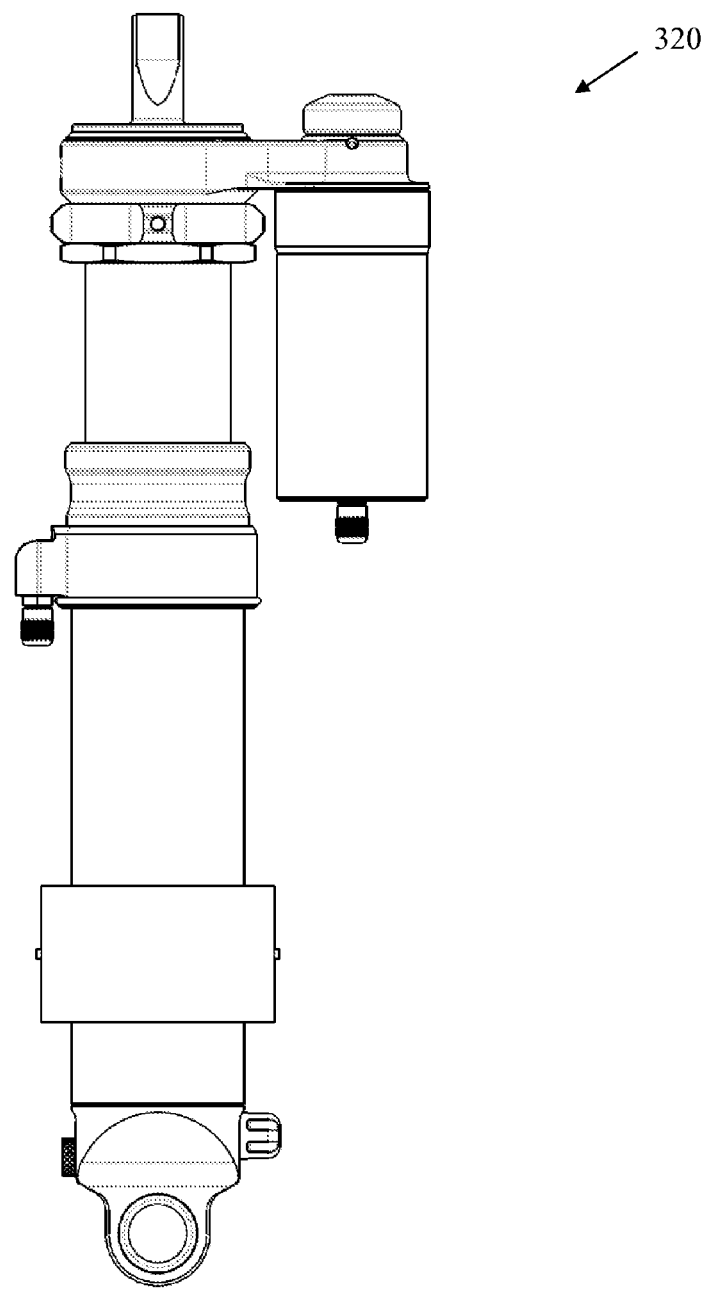
FIG. 9 is a side elevational view of an airspring and shock absorber according to another embodiment of the present invention.
Figure 10:
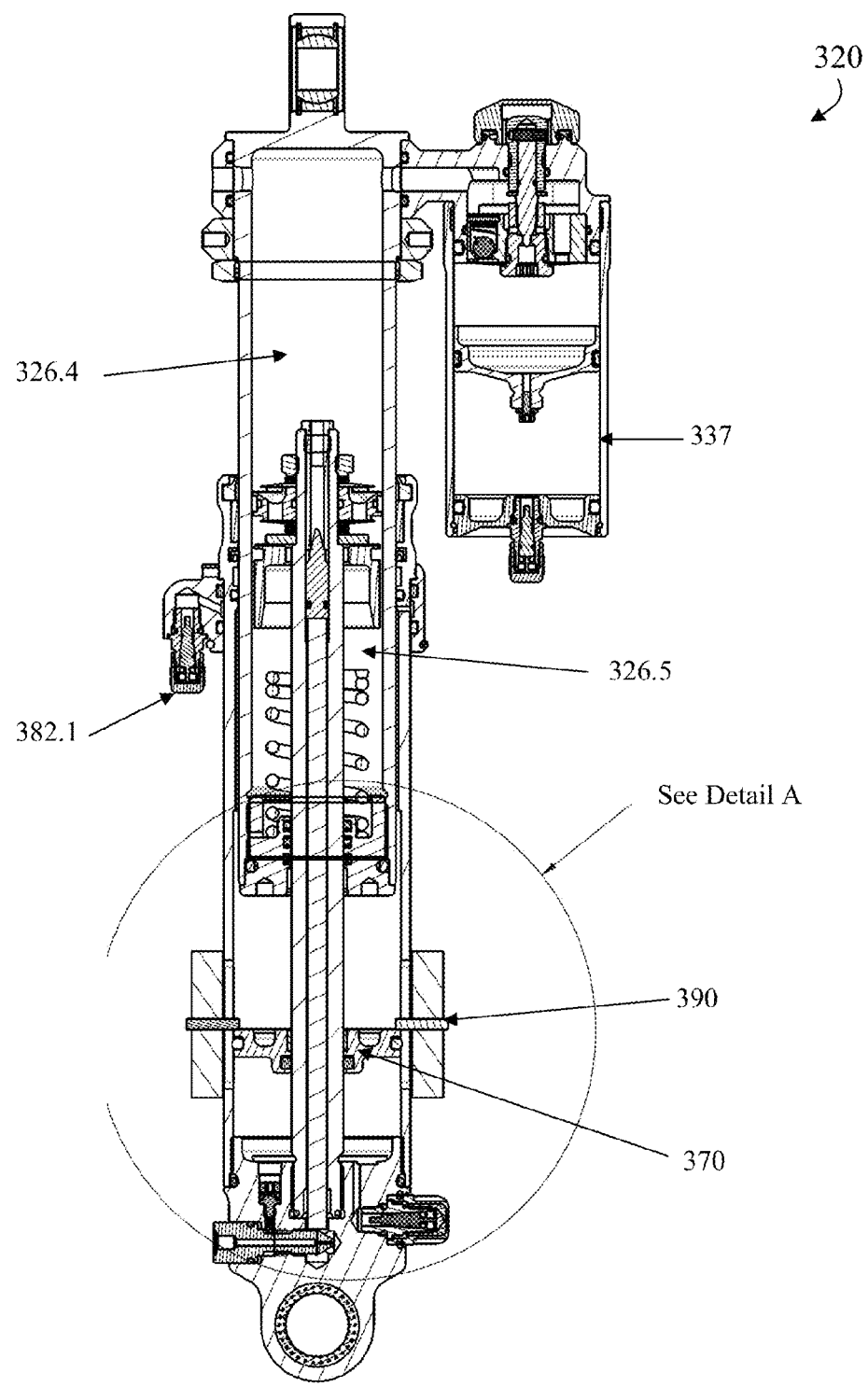
FIG. 10 is a side elevational cutaway view of the apparatus of FIG. 9.
Figure 11:
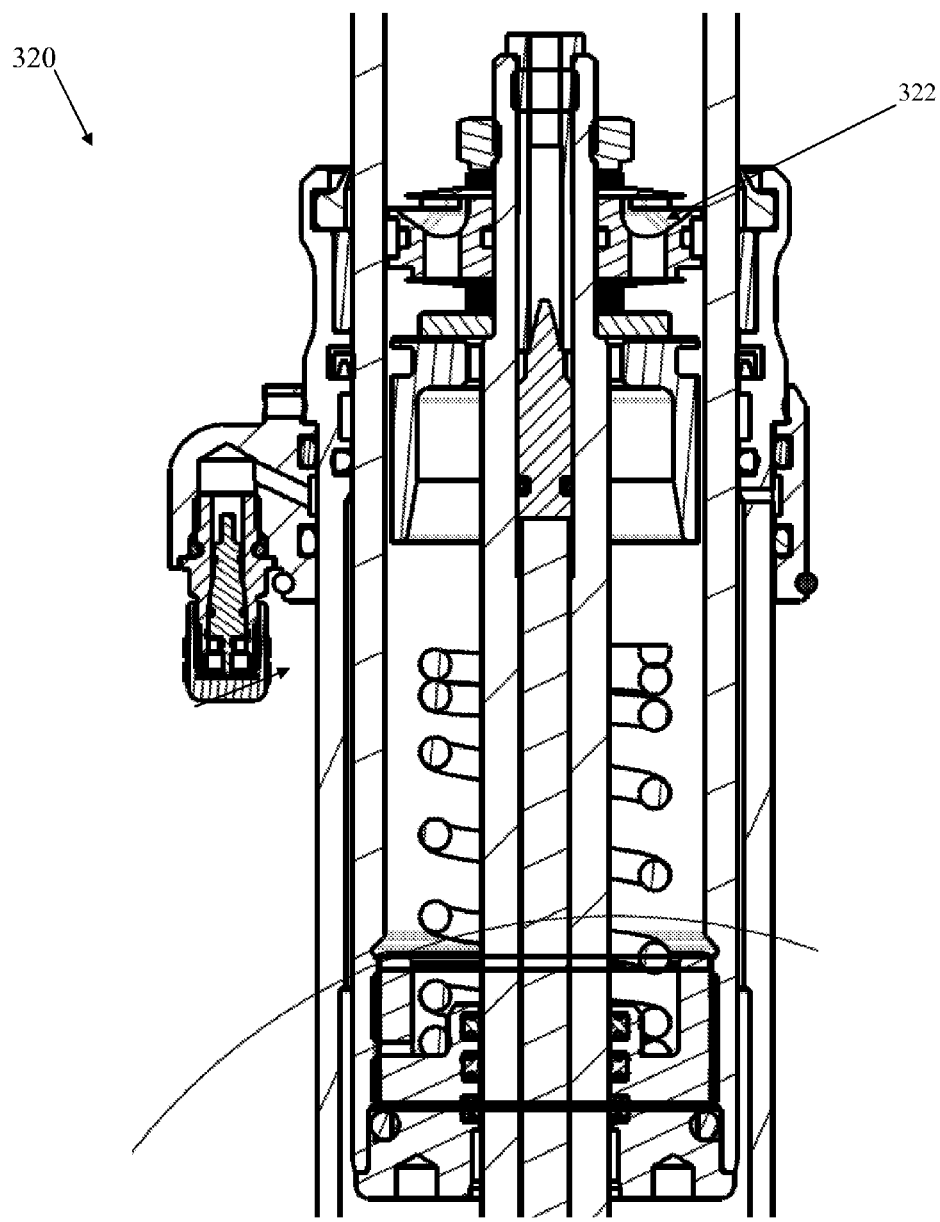
FIG. 11 is an enlargement of a portion of the apparatus of FIG. 10.
Figure 12:
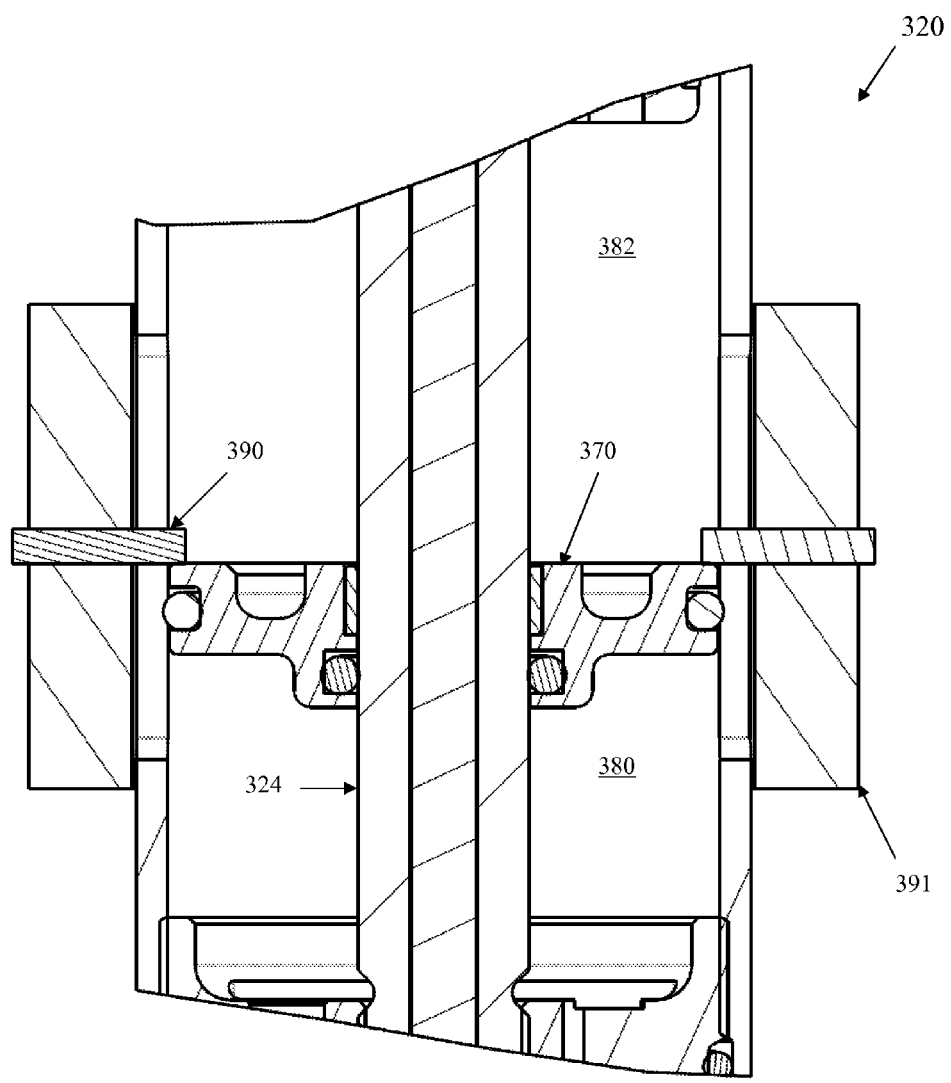
FIG. 12 is an enlargement of a portion of the apparatus of FIG. 10.

FIGS. 6, 7, and 8 depict an apparatus 220 according to another embodiment of the present invention. Apparatus 220 is the same as apparatus 20, 20' and 120, except as shown and described.

Shock absorber 220 includes an external adjustment screw 224.5, the action of which results in translation of a push rod 224.6 within an internal passage 224.1 of rod 224. Longitudinal movement of shaft 224.6 presses against a metering needle 224.3 that provides variable resistance within the rebound bleed flowpath, similar to that described previously for apparatus 20'. Shock absorber 220 further includes an externally accessible valve 282.1 similar to the valve 82.2 shown and described with regards to apparatus 120.

FIGS. 9, 10, 11, and 12 show various views of an apparatus 320 according to another embodiment of the present invention. Apparatus 320 is the same as apparatus 220, except as shown and described. Apparatus 320 includes an externally adjustable internal travel stop 390 that limits the travel of floating piston 370 in one direction.

In one embodiment, the external adjustment includes an outer cylindrical spacer or sleeve 391 that includes a pair of pins 390 on its inner diameter. Each of these pins extends into a respective longitudinal slot cut into the cylinder wall. The pins extend inwardly a sufficient amount to interfere with sliding motion of floating piston 370. The outer sleeve 391 includes seals such as O-rings (not shown) on either side of the longitudinal slots in order to seal air within the enclosed gas volumes. In one embodiment, the outer diameter of the cylinder is threaded, and a pair of threaded nuts are provided on either end of the sleeve. The nuts can be moved along the length of the cylinder by their threaded engagement, so as to move the sleeve 391 and pins 390 along the centerline axis of the central rod. The pins can be placed on either side of the floating piston so as to stop its travel in either direction.

Figure 13A:
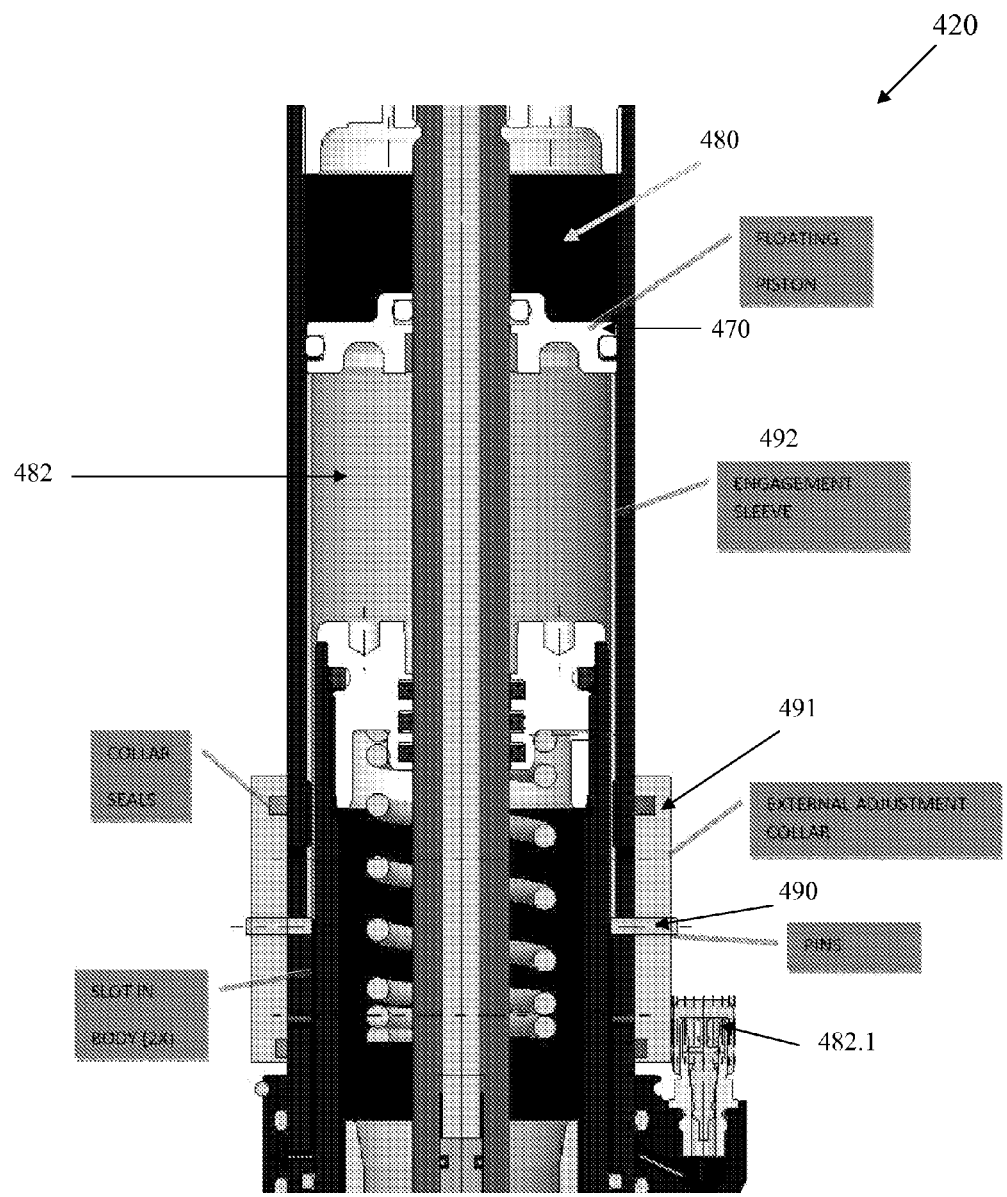
FIG. 13A is an enlargement of a cross sectional view of an apparatus according to another embodiment of the present invention.
Figure 13B:
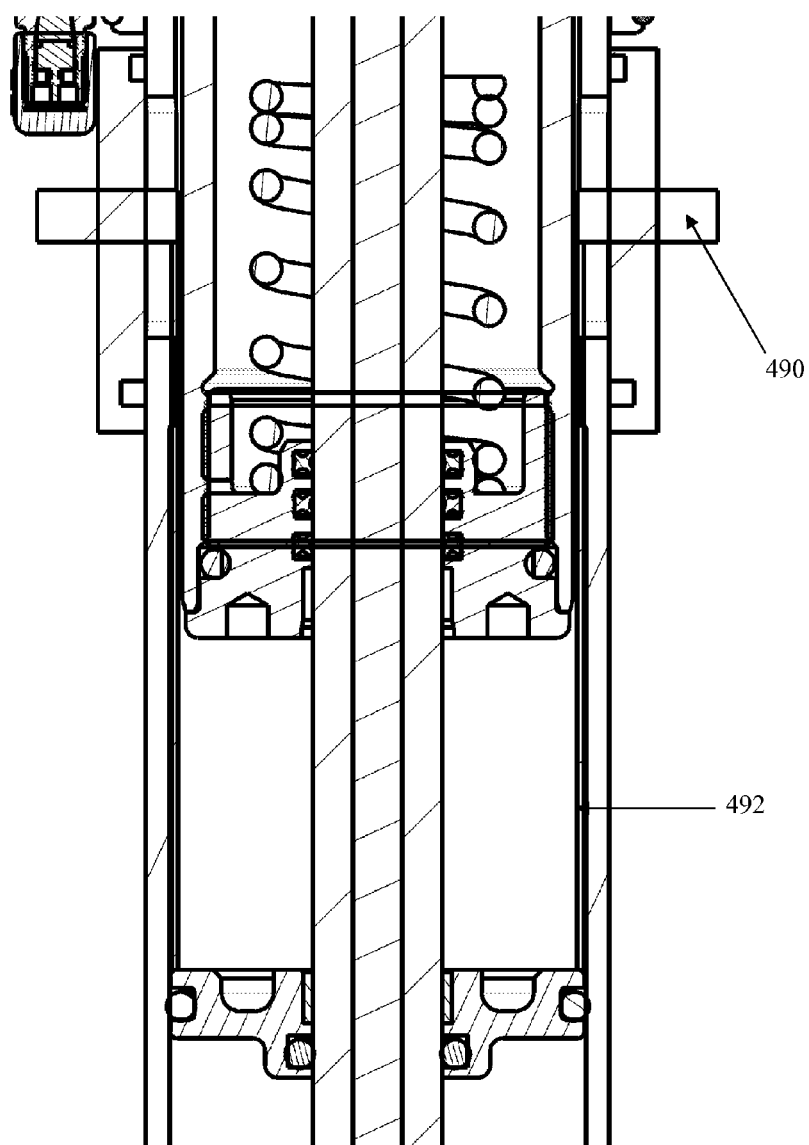
FIG. 13B shows the same apparatus as FIG. 13A except in a different drawing format.

FIGS. 13A and 13B are cross sectional representations of an apparatus 420 that is the same as apparatus 320, except as shown and described.

Apparatus 420 includes a floating piston 470, the travel of which is limited by its contact with an internal engagement sleeve 492. Sleeve 492 is preferably cylindrical, and at its topmost end (as viewed in FIG. 13), contacts and limits the downward motion of a floating gas piston 470. At the other end of sleeve 492, a pair of pins 490 establish the axial location of sleeve 492 along the longitudinal axis of the shock absorber. Pins 490 are maintained within slots in the cylindrical body of the shock absorber, and are further located on a collar 491 that is in sealing contact with the outer diameter of the shock absorber.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for biasing apart components of a vehicle suspension, comprising:
   providing a cylinder having a closed interior proximate to a closed end and an opened end, a floating piston slidably received within the closed interior of the cylinder and a hydraulic shock absorber slidably received within the opened end of the cylinder;
   defining a first sealed gas chamber between the floating piston and the closed end of the cylinder;
   defining a second sealed gas chamber by the floating piston, the shock absorber, and the opened end of the cylinder;
   sliding the shock absorber into the interior of the cylinder to a first position and moving the floating piston by compressing gas of the second chamber; and
   sliding the shock absorber into the interior of the cylinder to a second position further within the interior of the cylinder than the first position and moving the floating piston by pushing the floating piston with the end of the shock absorber.

2. The method of claim 1, wherein said sliding to the first position is resisted by a first forcing characteristic, said sliding to the second position is resisted by a second forcing characteristic, and the second characteristic provides more resistance than the first characteristic.

3. An apparatus for a vehicle suspension, comprising:
   a shock absorber having a sealed end;
   a cylinder having an interior, an opened end, and a closed end, said cylinder slidably receiving the sealed end within the opened end; and
   a floating piston having two sides and being slidably received within the interior between the sealed end and the closed end, said piston forming a first sealed gas chamber between one side and the closed end, and forming a second sealed gas chamber between the other side and the opened end;
   wherein the sealed end extends into the second chamber.

4. The apparatus of claim 3, wherein said shock absorber has an outer diameter, said cylinder has an inner diameter, and the second chamber includes an annular volume between the outer diameter and the inner diameter, the annular volume increasing as said shock absorber slides into the interior.

5. The apparatus of claim 3, wherein said cylinder has an inner diameter, and which further comprises a seal mounted to the inner diameter.

6. The apparatus of claim 3, which further comprises a rod, said rod being coupled to the closed end and extending through the interior into the sealed end.

7. The apparatus of claim 3, which further comprises a guiding member within the interior, said piston being slidably movable along said guiding member, said piston being sealed to said guiding member.

8. The apparatus of claim 3, wherein sliding movement of said floating piston by one unit of distance within the first chamber changes the volume of the first chamber by a first amount, and sliding movement of the sealed end by one unit of distance within the second chamber changes the volume of the second chamber by a second amount, and the second amount is less than the first amount.

9. The apparatus of claim 3, which further comprises means for biasing said floating piston apart from the closed end.

10. The apparatus of claim 3, which further comprises an external adjustment for stopping the sliding motion of said floating piston at a position intermediate of the sealed end and the closed end.

11. An apparatus for a vehicle suspension, comprising:
a shock absorber having a sealed end;
a cylinder having an interior, an opened end, and a closed end, said cylinder slidably receiving the sealed end within the opened end;
a piston slidably received within the interior between the sealed end and the closed end, said piston and the closed end forming a first sealed gas chamber, and said piston, said shock absorber, and the opened end forming a second sealed gas chamber;
a first external valve for providing gas into said first chamber;
a second external valve for providing gas into said second chamber; and
a guiding member within the interior, said piston being slidably movable along said guiding member, said piston being sealed to said guiding member.

12. The apparatus of claim 11, wherein said shock absorber has an outer diameter, said cylinder has an inner diameter, and the second chamber includes an annular volume between the outer diameter and the inner diameter, the annular volume increasing as said shock absorber slides into the interior.

13. The apparatus of claim 11, wherein said cylinder has an inner diameter, and which further comprises a seal mounted to the inner diameter.

14. The apparatus of claim 11, which further comprises a rod, said rod being coupled to the closed end and extending through the interior into the sealed end.

15. The apparatus of claim 11, wherein said shock absorber is a cylindrical hydraulic shock absorber including a rod extending therefrom and a hydraulic piston attached to said rod, said hydraulic piston being slidable within the cylinder of said shock absorber.

16. The apparatus of claim 11, which further comprises a flexible elastomeric member within the first chamber, said elastomeric member being repeatedly collapsible and repeatedly expandable.

* * * * *

UNITED STATES PATENT AND TRADEMARK OFFICE
CERTIFICATE OF CORRECTION

PATENT NO. : 8,403,115 B2  
APPLICATION NO. : 12/352279  
DATED : March 26, 2013  
INVENTOR(S) : Gartner et al.

Page 1 of 1

It is certified that error appears in the above-identified patent and that said Letters Patent is hereby corrected as shown below:

In the Claims

In column 8, line 4, delete "haying" and insert --having--.

Signed and Sealed this
Fourth Day of June, 2013

Teresa Stanek Rea
*Acting Director of the United States Patent and Trademark Office*